US005793353A

United States Patent [19]

Wu

[11] Patent Number: 5,793,353
[45] Date of Patent: Aug. 11, 1998

[54] CURSOR POINTING DEVICE BASED ON THIN-FILM INTERFERENCE FILTERS

[75] Inventor: Frederick Yung-Fung Wu, Cos Cob, Conn.

[73] Assignee: International Business Machines Corporation, Armonk, N.Y.

[21] Appl. No.: 647,649

[22] Filed: May 15, 1996

Related U.S. Application Data

[63] Continuation of Ser. No. 368,458, Jan. 4, 1995, abandoned.

[51] Int. Cl.[6] .................................................. G09G 5/00
[52] U.S. Cl. ............................................. 345/156; 345/158
[58] Field of Search .............................. 345/156, 157, 345/158, 163, 165, 166; 250/216; 178/18, 19; 341/21, 22, 23

[56] References Cited

U.S. PATENT DOCUMENTS

| 4,558,313 | 12/1985 | Garwin et al. ............. 178/18 R |
| 4,565,999 | 1/1986 | King et al. . |
| 4,682,159 | 7/1987 | Davison ................... 345/158 |
| 4,823,170 | 4/1989 | Hansen . |
| 4,851,664 | 7/1989 | Rieger ....................... 250/226 |
| 5,045,843 | 9/1991 | Hansen . |
| 5,444,193 | 8/1995 | Satoh et al. ................ 178/18 |

FOREIGN PATENT DOCUMENTS

| 0123043 | 10/1984 | European Pat. Off. ........ 345/158 |
| WO 88/04060 | 6/1988 | WIPO . |

*Primary Examiner*—Chanh Nguyen
*Attorney, Agent, or Firm*—Whitham, Curtis & Whitham; Stephen C. Kaufman, Esq.

[57] ABSTRACT

A hand-held pointing device for positioning a cursor on a display having a plurality of illuminating devices at a periphery thereof, includes a housing, an interference filter coupled to the housing, a device for detecting light having been emitted from the plurality of illuminating devices and filtered by the interference filter, a device, coupled to the detecting device, for distinguishing a region of the periphery of the display from which the light having been detected originates, and a device for translating the detected light into values for positioning the cursor on the display.

11 Claims, 6 Drawing Sheets

CURSOR POINTING DEVICE BASED ON THIN-FILM INTERFERENCE FILTERS

This is a Continuation of application Ser. No. 08/368,458 filed Jan. 4, 1995 now abandoned.

BACKGROUND OF THE INVENTION

1. Field of the Invention

The present invention generally relates to a pointing device and more particularly to a pointing device for positioning a cursor on a display screen.

2. Description of the Related Art

There is a wide variety of conventional devices available for input of data into computers. Examples of such devices are keyboards, mice, light pens, trackballs, pointing sticks, touch screens, speech recognition systems, joysticks, etc.

Each of these conventional devices has advantages and disadvantages for any particular application or user. For example, touch screens require minimal training and use direct eye-hand coordination, but have limited resolution, require the user to be very close to the display, and may cause arm fatigue.

"Mice" are inexpensive devices and do not obscure the user's view of the screen, but they require a flat surface and can only transmit relative movement information. Further, they require appropriate space next to the keyboard for manipulation by the operator. Additionally, mechanical mice pick up dirt and become unreliable, whereas optical mice require a special grid surface. Additionally, a mouse uses unnatural pointing motions and makes drawing on the screen extremely difficult. Further, the mouse is only a relative positioning device, not an absolute positioning device. The operation of an absolute positioning device is more natural to most users because it more closely resembles the usual physical action of "pointing" to an object or an area of interest. Thus, a relative positioning device is much more difficult and cumbersome to use. A further drawback of the relative positioning devices is the phenomenon of "losing" the cursor, in which the user has difficulty in locating (immediately or otherwise) the present position of the cursor on a cluttered display screen. This makes drawing difficult and time-consuming.

Trackballs are also conventionally used but they require at least a 2-inch ball and housing near or attached to the keyboard, and are relatively large structures. Further, trackballs, similarly to mice discussed above, are relative positioning devices and the movement of a trackball is quite unnatural for drawing.

Joysticks are conventionally used but are only capable of low accuracy and resolution. Further, joysticks are difficult to use for drawing.

Light pens are useful in some applications, but they must be used on or very near the display screen. Light pens are not available in a wide range of positions distant from the screen. Further, users suffer arm fatigue from holding the light pen to the screen. Light pens also cannot be comfortably held close to the user's body or desk. Moreover, the operator's arm may obscure the display with a light pen.

Touch screens are yet another conventional device for inputting data into a computer, but similarly to light pens quickly cause arm fatigue and the operator's arm may obscure the display since the operator's arm must be close to the screen. Further, touch screens have limited resolution.

Optical pointing devices are also known which use a single fixed light source on the display and an imaging optical system on the movable pointing device. However, the optical system forms an image of the light source on a position sensing detector and thus requires a lens and is affected by defocussing of the image as the distance of the device from the screen changes. Additionally, since the position-sensor in the movable pointing device defines horizontal and vertical displacement axes, if the user rotates the device, incorrect direction information may be collected. For example, if the user rotates the device by ninety degrees, then a horizontal movement of the device will be interpreted as a vertical movement, and produce a corresponding vertical movement of the cursor on the screen.

As discussed above, each of the conventional input devices have significant drawbacks.

SUMMARY OF THE INVENTION

It is therefore an object of the present invention to provide a pointing device for inputting data into a computer and which overcomes the problems discussed above with regard to the conventional pointing devices.

Another object is to provide a suitable pointing device which is small, compact and flexible with regard to its positioning and which is an absolute positioning device and in which the movement of the device is natural for drawing.

Yet another object is to provide a pointing device according to the present invention which takes into account resolution, parallax, space required, accuracy, and ergonomics.

In a first aspect of the invention, a pointing device is provided which is preferably hand-held and is for positioning a cursor on a display having a plurality of illuminating devices at a periphery thereof.

The pointing device includes a housing, an interference filter coupled to the housing, means for detecting light emitted by the illuminating devices at the periphery of the display and filtered by the interference filter, means, coupled to the means for detecting, for distinguishing a region of the periphery of the display from which the light having been detected originates, and means for translating the detected light into values for positioning the cursor associated with the pointing device.

The pointing device according to the invention allows a user to position a cursor by aiming a small, handheld "pointer" at the desired screen location. The inventive pointer does not require any desktop space, does not obstruct the user's view of the screen, and can be used at a range of distances from the screen.

Further, the invention preferably includes multiple illumination means at the periphery of the display, a movable device containing at least one detector of light filtered by interference filters, means for distinguishing the region of the display periphery from which the detected light signals originate, and means for translating the detected signals into values used to position a cursor.

With the invention, a pointing device for inputting data into a computer is provided which is small, compact and flexible with regard to its positioning and which is an absolute positioning device. The movement of the device is natural for drawing. Further, the inventive pointing device has high resolution and takes up little space, is highly accurate and does not cause operator fatigue as quickly as the conventional systems.

BRIEF DESCRIPTION OF THE DRAWINGS

The foregoing and other objects, aspects and advantages will be better understood from the following detailed

Figure 1A:
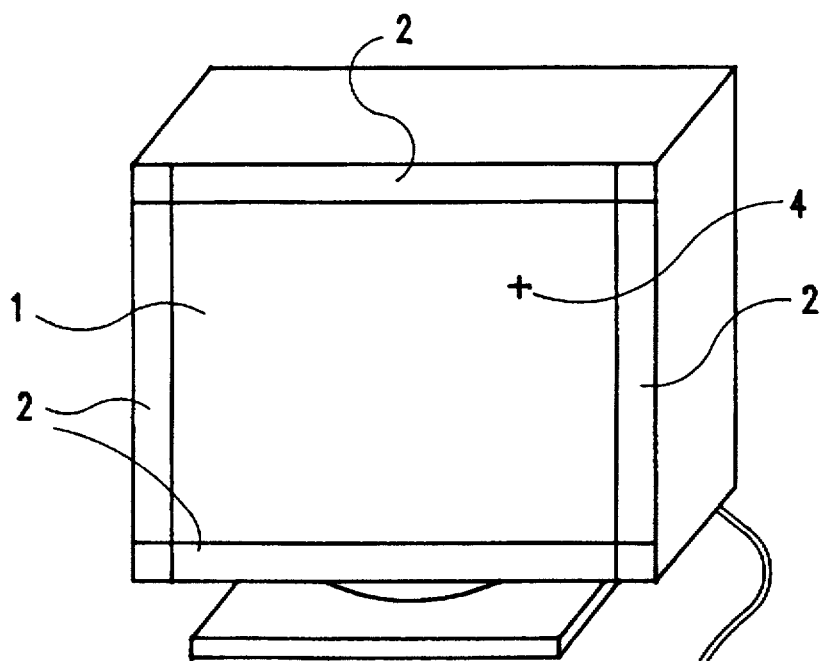

3 description of a preferred embodiment of the invention with reference to the drawings, in which:

FIG. 1A illustrates a pointing apparatus in conjunction with a display screen according to the present invention.

Figure 1A:
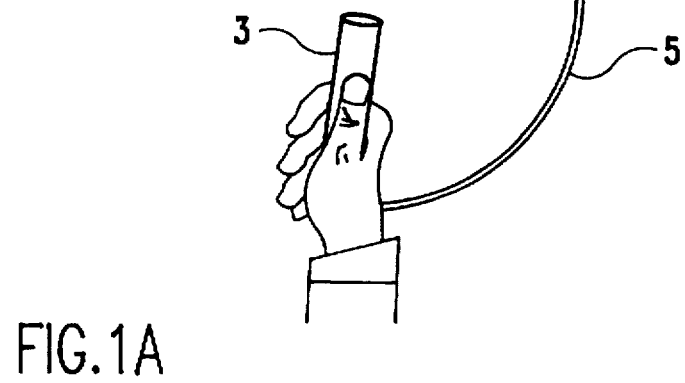
Figure 1B:
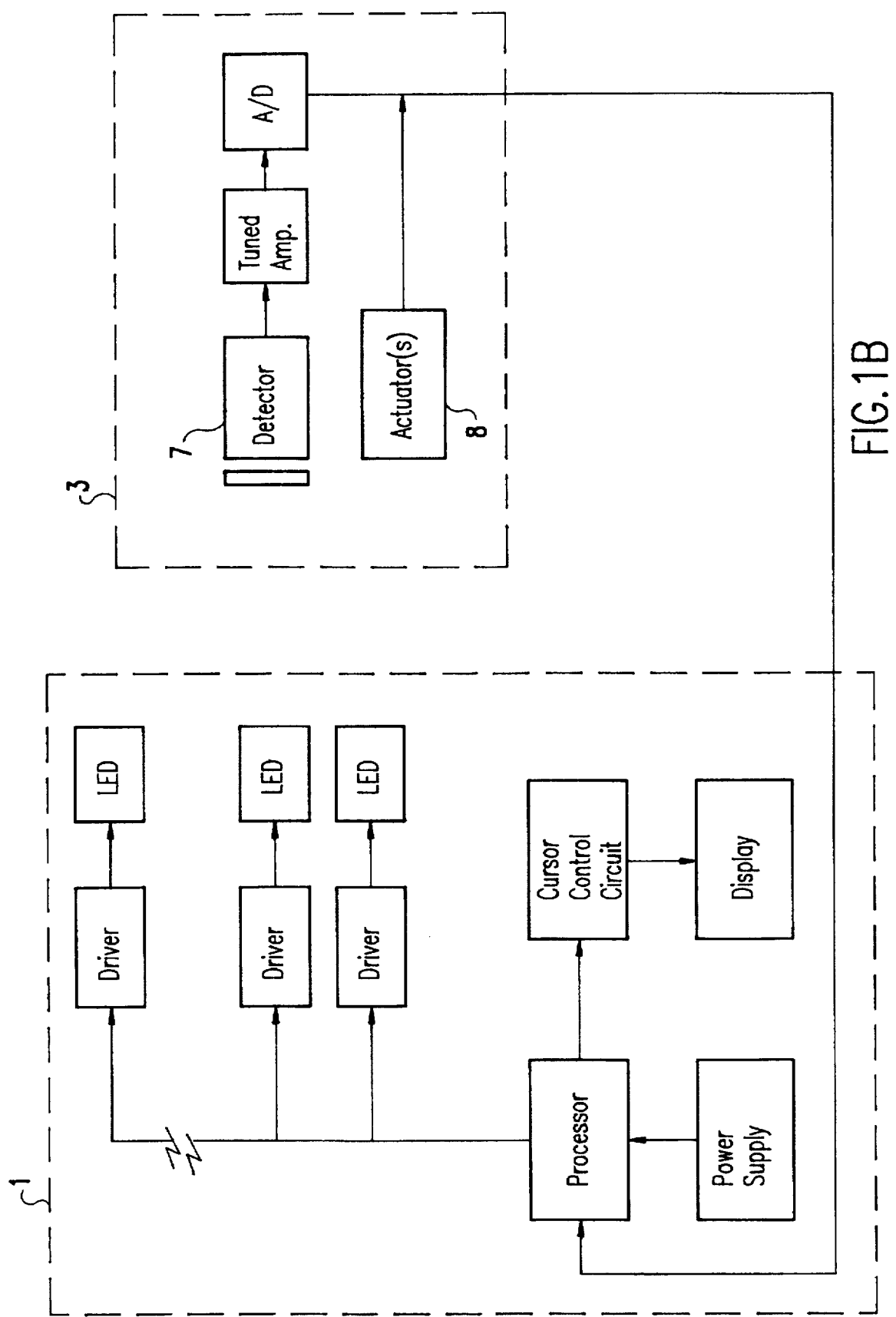

FIG. 1B schematically illustrates a block diagram of the pointing apparatus in conjunction with a display screen according to the present invention as shown in FIG. 1A.

Figure 2:
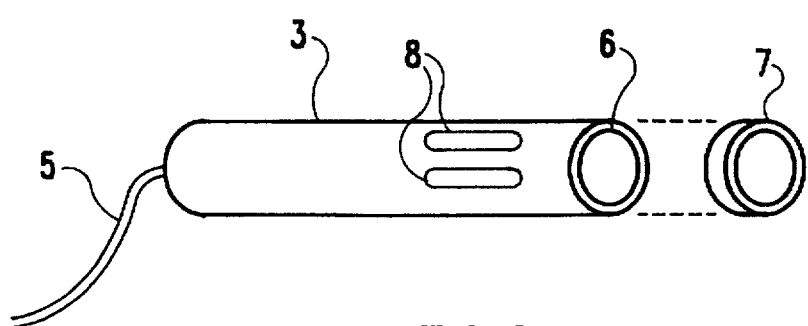

FIG. 2 illustrates the pointing apparatus shown in FIGS. 1A and 1B according to the present invention in greater detail.

Figure 3:
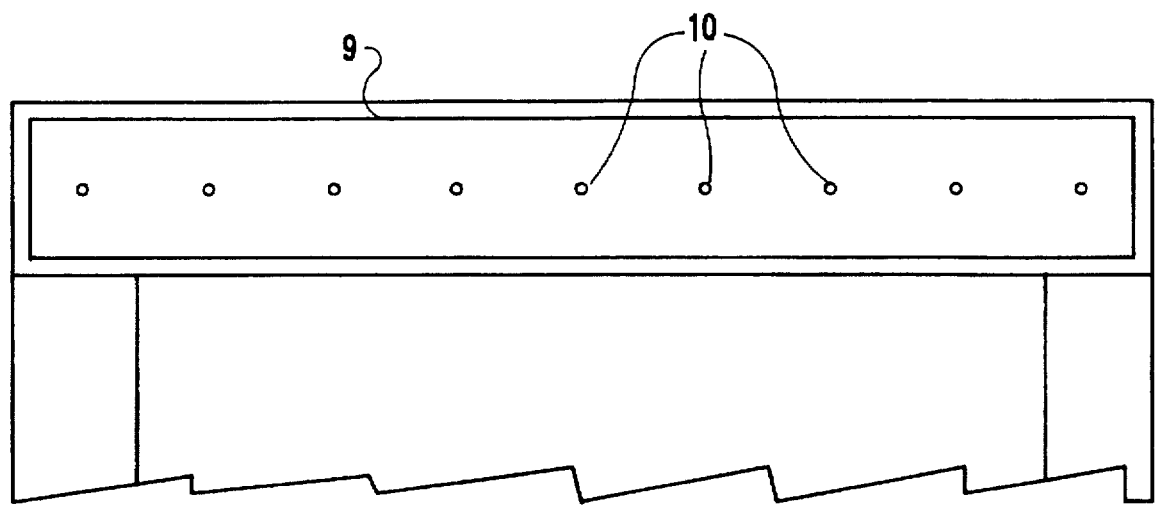

FIG. 3 illustrates one of a plurality of illumination panels adjacent to the display screen area.

Figure 4:
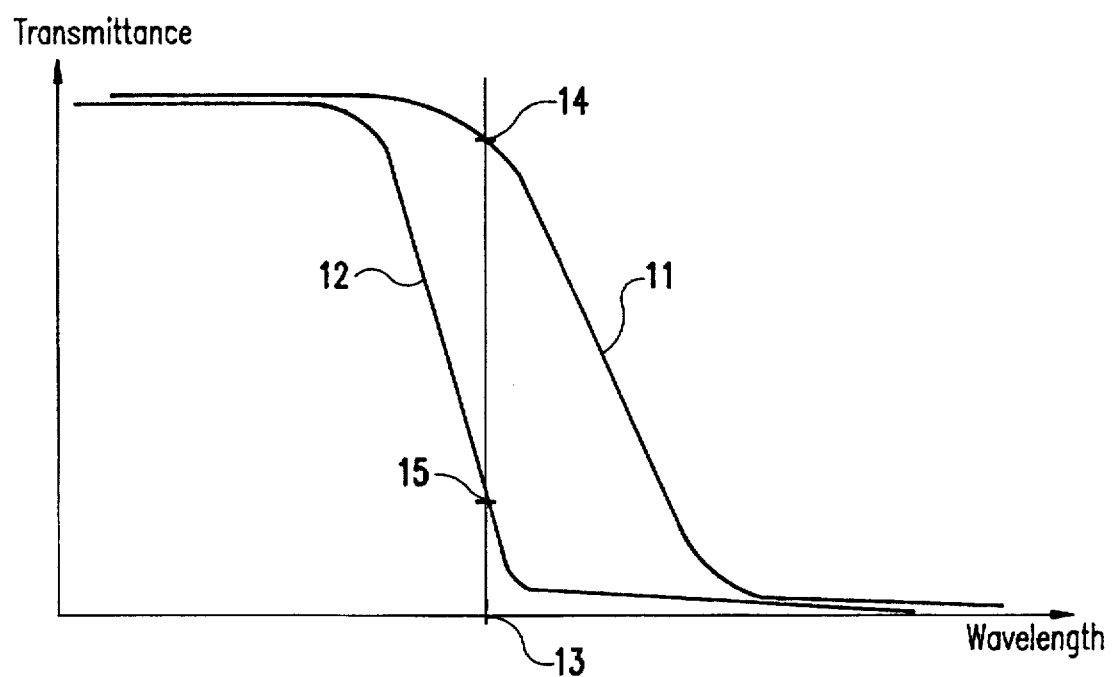

FIG. 4 is a graphic representation of transmittance in relation to wavelength and is for illustrating a property of angle-dependent transmittance in thin film filters used in the pointing apparatus according to the present invention.

Figure 5:
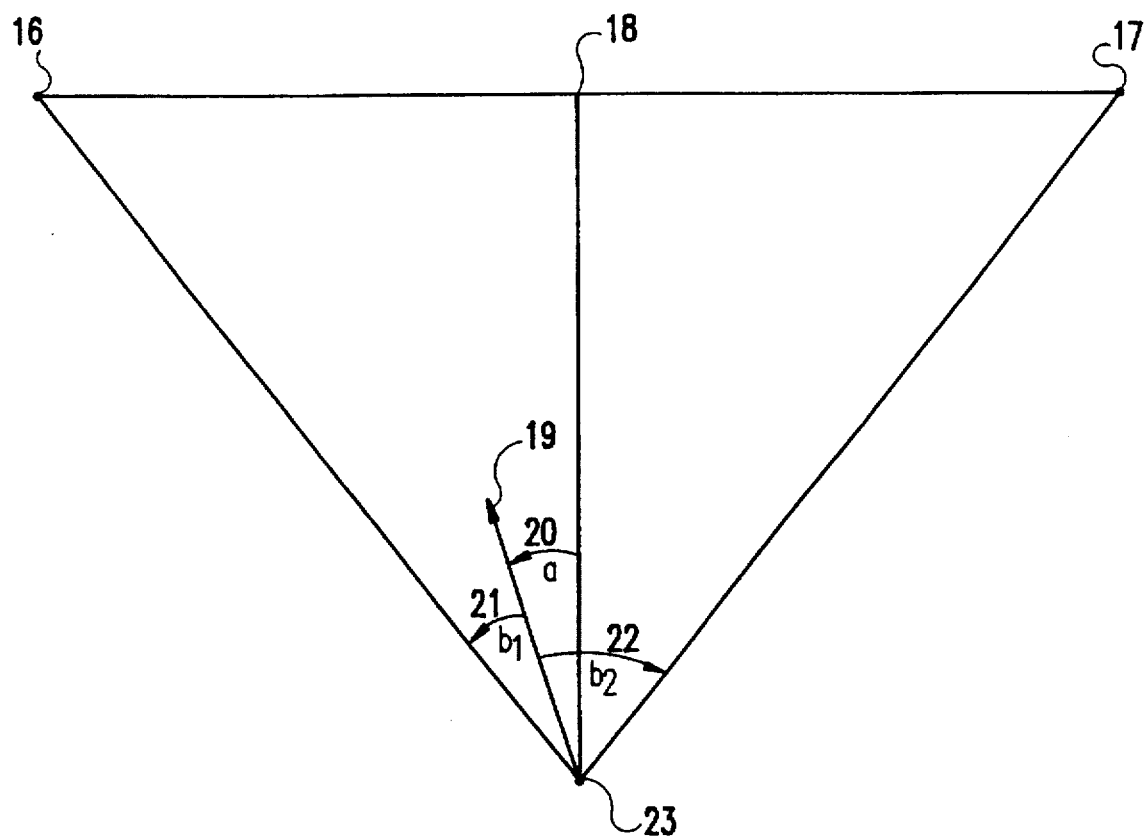

FIG. 5 illustrates the manner of using the property shown in FIG. 4 in the pointing apparatus according to the present invention.

Figure 6:
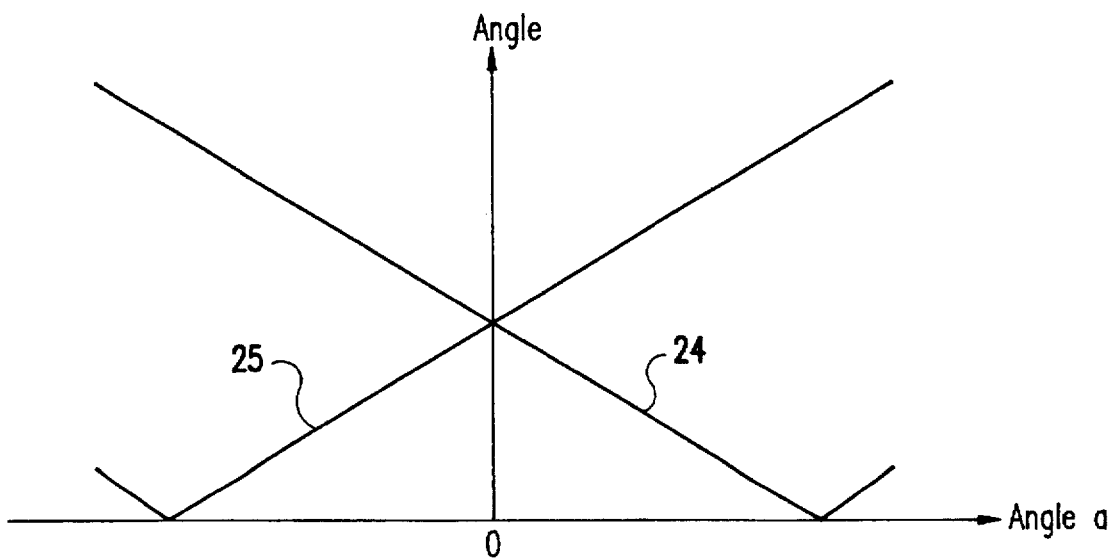

FIG. 6 illustrates the dependence of angles "b1" and "b2" to angle "a".

Figure 7:
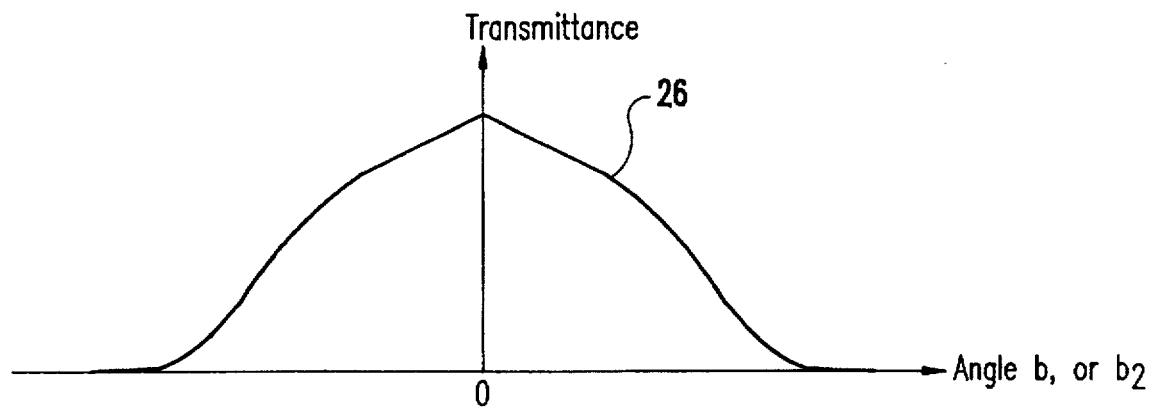

FIG. 7 illustrates the transmitted light of the filter as a function of angle "b1" or "b2".

Figure 8:
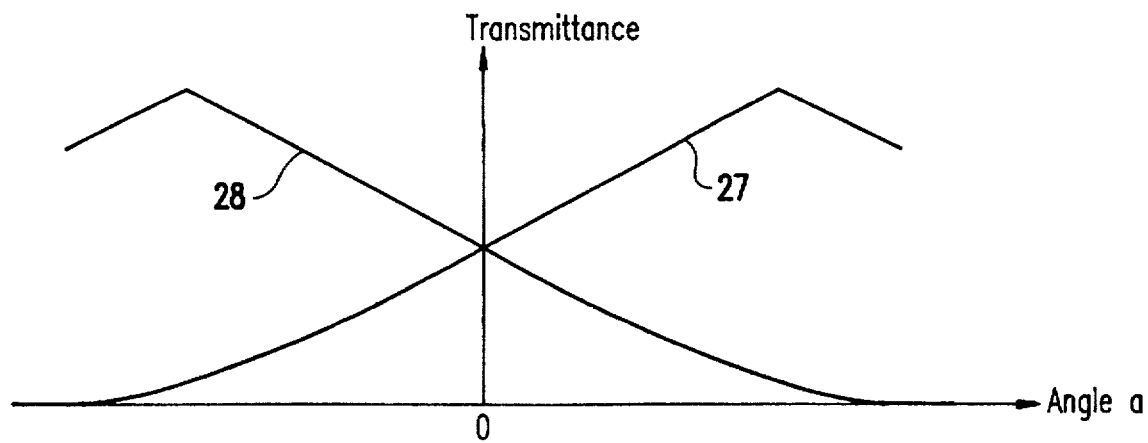

FIG. 8 illustrates the transmitted light of the filter as a function of angle "a".

Figure 9:
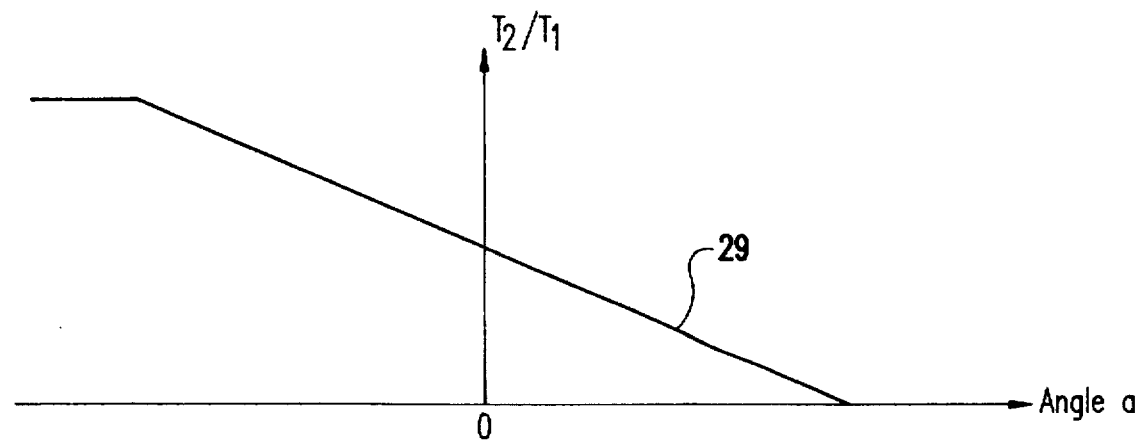

FIG. 9 illustrates the ratio of the transmitted light from two sources to angle "a".

Figure 10:
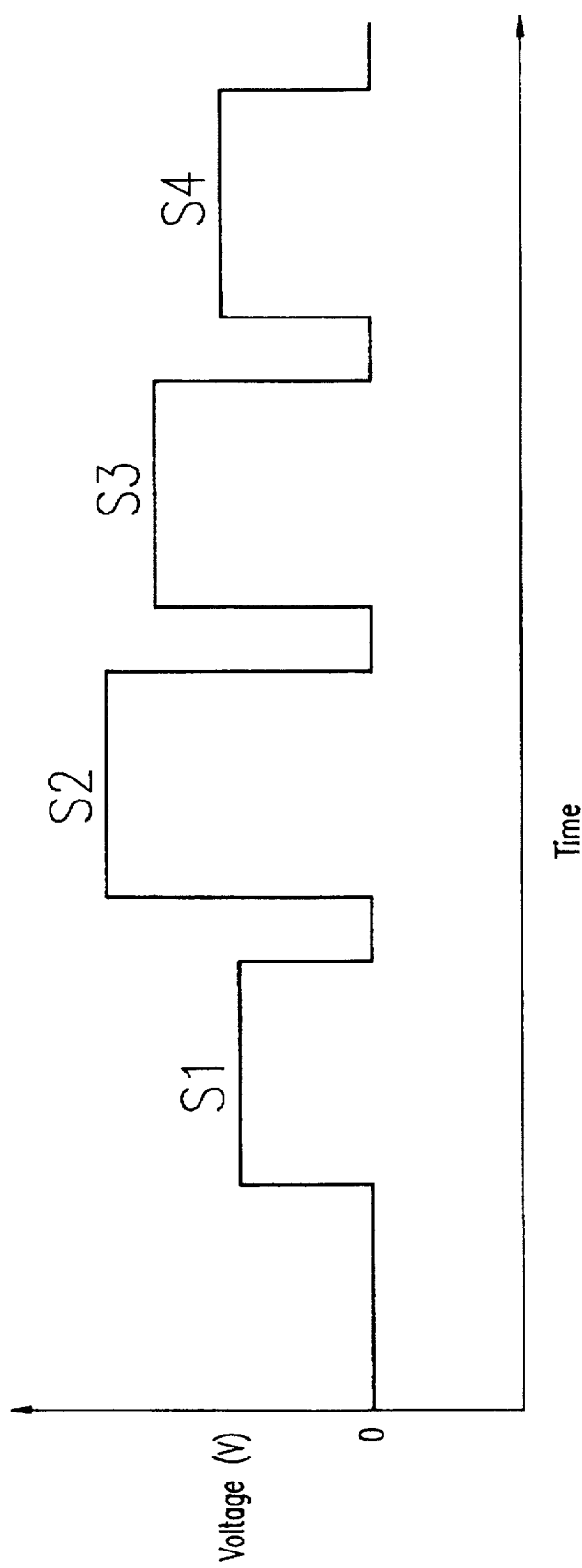

FIG. 10 illustrates the resulting signal output by the pointing apparatus according to the invention after the photodetector output having been amplified and demodulated.

DETAILED DESCRIPTION OF A PREFERRED EMBODIMENT OF THE INVENTION

Referring now to the drawings, and more particularly to FIGS. 1A–1B, there is shown a pointing device 3 for use in a variety of different applications. The pointing apparatus according to the invention is particularly applicable for users of computer input devices, such as mice, trackballs, joysticks, touch screens, etc.

In the exemplary system shown in FIGS. 1A–1B, the pointing device is for use with a display 1 having a display screen. The display can be any of a number of known types including a cathode ray tube (CRT) or conventional monitor. The display includes light emitting panels 2 at the sides of the display. The system includes the pointer 3, which is attached to the computer (processor) or display by a suitable cable 5. The pointer 3 is for positioning a cursor 4 on the screen of the display 1.

FIG. 1B illustrates in block diagram form the components of the display 1 and the pointing device 3.

The display 1 includes a conventional processor (or microcomputer) powered by a suitable power supply and coupled to a cursor control circuit (unreferenced in FIG. 1B) for controlling the position of the cursor on the display as well as to suitable drivers (unreferenced) coupled to light emitting diodes (LEDs) (unreferenced) or the like.

The pointer 3, as described in further detail below, includes a filter, a detector (e.g., a photodetector) for providing an output to a tuned amplifier or the like, an analog-to-digital (A/D) converter for receiving the analog output of the amplifier circuitry and for digitizing the analog output and providing the output according to one or more actuators 8 (e.g., selection buttons or the like), to the processor (e.g., microprocessor, computer, etc.).

4

As shown in FIG. 2, the pointer 3 includes a housing (unreferenced) and at least one light sensor 6 (e.g., a photodetector) such as photodiodes or the like, covered by an interference filter 7 in addition to any absorptive filters (not illustrated) necessary to block ambient light as required and as known in the art. The interference filter(s) 7 is preferably a thin-film bandpass interference, filter, such as those commercially available from the Oriel Corporation. The description below assumes a single light sensor is used. However, it is obvious that a plurality of light sensors may be suitably used.

The pointer also includes one or more actuators (e.g., buttons) 8 thereon for item selection, analogous to the buttons or actuators on a "mouse".

The detector 6 senses the amount of light passing through the interference filter 7. The resulting signal is amplified and filtered by an amplifier tuned to the frequency of the illuminator drivers. This well-known technique is used in conventional remote control devices to provide high sensitivity with excellent immunity to interference from ambient light. The filtered signal is digitized and transmitted to the computer or monitor via the cable 5. The pointer 3 of the present invention is preferably implemented with standard commercially available components such as IR LEDs available, for example, from Honeywell Microswitch, Inc., an IR interference filter commercially available from the Oriel Corporation, and a silicon photodiode commercially available from United Detector Technology, Inc.

Circuitry for switching the light-emitting diodes (LEDs) of the display, filtering, digitizing and synchronized sampling of the detector output are required, but the construction thereof is believed to be well-known and well within the grasp of the ordinarily skilled artisan within the purview of this application.

FIG. 3 illustrates one of the four illumination panels 9 adjacent the display screen area.

The panel 9 includes light sources 10, such as light-emitting diodes or the like, and are arranged so that the panel 9 is nearly uniformly illuminated. A diffusing plate (not illustrated) is preferably positioned in front of the light sources 10 to make the panel appear as a light source that is uniform both angularly and spatially (e.g., in one direction).

A principle exploited in this invention is the property of angle-dependent transmittance in thin-film interference filters. At normal incidence, the filter 7 has a transmittance characteristic 11. However, as the incidence angle is changed, the curve as shown in FIG. 4, shifts toward shorter wavelengths. For example, at an incidence angle of 20 degrees from the normal, the characteristic is shown at reference numeral 12.

If the light to be detected has a fixed wavelength (e.g., such as 950 nm.) as shown at reference numeral 13, then at normal incidence the fraction of light transmitted is as shown at reference numeral 14. At 20 degrees, the fraction of light transmitted decreases as shown at reference numeral 15.

FIG. 5 illustrates an exemplary method in which this effect can be used in a pointing device according to the present invention. For simplicity, the function of the device will be described in just one axis. Operation in a second axis is similar but independent from that of the first axis.

Specifically, the center of the display screen is indicated at reference numeral 18 as an absolute position, and the light panels having light sources at the sides of the display are indicated as reference numerals 16, 17. The filter end of the pointer 3 is located in the space in front of the display at reference numeral 23. The axis of the pointer (assumed to be in the shape of a cylinder) is along a direction 19.

The angle between the pointer axis 19 and the direction from the pointer 23 to the center of the display 18 is shown as angle "a" (e.g., reference numeral 20). The angle between the pointer axis 19 and the direction from the pointer 23 to the light panel 16 is "b1" (e.g., reference numeral 21). The angle between the pointer axis 19 and the direction from the pointer 23 to the other light panel 17 is "b2" (e.g., reference numeral 22).

As angle "a" increases, (e.g., the pointer axis 19 is directed further toward the left), angle "b1" decreases (e.g., the light from light panel 16 strikes the filter at a smaller angle (e.g., see reference numeral 24 (more nearly normal)), as shown in FIG. 6. Simultaneously, angle "b2" increases (e.g., the light from light panel 17 strikes the filter at a larger angle (e.g., see reference numeral 25 (further from normal)).

As the angle "a" continues to increase, eventually angle "b1" passes through zero, and starts to increase again.

Similar angle changes occur when the pointer is directed toward the right side of the display.

If the wavelength of the light sources 10 is chosen such that it occupies a position 13, as shown in FIG. 4, relative to the filter transmission at normal incidence 11, then the transmitted light as a function of angle "b1" or "b2" will be as shown by curve 26 as shown in FIG. 7. The transmitted light is maximized at normal incidence and decreases monotonically as the angle departs from the normal.

Using the dependence of angles "b1" and "b2" on angle "a" from FIG. 6, FIG. 8 clearly illustrates that the transmittance of the filter as a function of angle "a" for the two light sources 16 and 17 will be as shown at curves 27 and 28, respectively. The ratio of the transmittances from the two sources with regard to angle "a" is plotted as curve 29 in FIG. 9.

The light signals emitted by sources 10 in each of the four illuminated panels 2 is preferably distinguishable from each other as well as from ambient light, so as to make the light signals more easily detectable.

Use of infrared (IR) emitters such as IR light-emitting diodes (LEDs) as the sources 10 and an absorption-type visible-blocking infrared-transmitting filter 7 in conjunction with the interference filter(s) helps prevent confusion with ambient light, and also is not annoying to the human user reading the display. Thus, IR emitters (and corresponding filters) are preferably used.

There are several ways in which the light signal emitted by the four panels 2 can be differentiated. In a first method, the sources 10 in each panel 2 are pulsed in sequence. For example, first the sources 10 in the top panel are turned on for a short time, then the sources 10 in the right panel are turned on for a short time, and so on. The pulse duration can be short (e.g., on the order of 1 msec) and the pulsing rate high (once every 10 msec) to provide fast response to movement of the pointer. The light source is preferably modulated at a high frequency (e.g., such as 50 kHz) for the duration of each pulse, for improved detection sensitivity as is common practice for infrared remote control devices (e.g., such as for televisions and video cassette recorders (VCRs)).

In this manner, only the sources 10 in one panel are emitting at any one time. The circuit that pulses and switches the sources is synchronized with the detection circuit, thereby allowing the light signal to be correctly associated with one panel at any instant. Then, the light signals so detected are used to calculate the transmittance ratio plotted in FIG. 9. As mentioned above, the pulse duration is preferably short and the pulsing rate high to provide fast response to movement of the pointer.

Another similar method is to modulate the output of each light panel at a different frequency (e.g., such as 1 kHz, 4.5 kHz, 8.3 kHz, 13 kHz, etc.).

Then, the output of the detector is demodulated by a demodulator at each of the four frequencies, yielding signals proportional to the light detected from each of the four panels. The frequencies should be chosen carefully to ensure that each demodulator is insensitive to the other modulation frequencies.

Yet another method is to use a plurality (e.g., four) different wavelength light sources 10, so that each of the four panels 2 emits light having a different wavelength. In this case, the pointer 3 must contain four independent detectors 6 (one per light source provided) and filters 7. Each filter preferably has a transmittance characteristic matched to the wavelength of one of the panel's sources. The filter characteristic can be of the bandpass-type instead of the shortpass-type, to minimize mixing of signals from different sources. Just as with shortpass interference filters, bandpass interference filters have transmittance curves that shift with angle.

Combinations of these methods are also envisioned by the present inventor. For example, two detectors could be used; one detector for the vertical direction and one detector for the horizontal direction. Each pair of sources preferably would be pulsed or modulated to provide differentiation. Furthermore, the cable 5 could be advantageously replaced by an optical (infrared) data link. The exact couplings and details of making such a connection with an optical data are believed well-known and thus will not be described herein.

After the four signals are obtained, the ratios (one for the vertical direction and one for the horizontal direction) are calculated. Then, the ratios are used by the cursor position circuit to show the cursor in the proper location on the display.

For example, FIG. 10 illustrates a representative signal after amplification and demodulation of the photodetector output. A sequence of four pulses is shown, S1 through S4. These voltages will be sampled at times synchronized with the light source driver, yielding a value for the height of each of the four pulses. As determined by the light source driver, S1 may correspond to the signal received from the light-side light panel, S3 may correspond to the signal received from the right-side panel, S2 from the top panel and S4 from the bottom panel. The microcomputer, shown in FIG. 1B, computes the ratio R1=S1/S3 and R2=S2/S4. These ratios can be directly converted into inputs to the cursor position circuit. Alternatively, they can be linearized or otherwise modified by a look-up table before being used by the cursor position circuit, as is common practice with pointing devices. Cursor control circuits are known in the art and are a part of all computer displays and thus will not be further described herein.

Furthermore, the signals can be digitized at any of a number of stages in the processing. For example, the output of the detector 6 could be digitized immediately, or it could be digitized after sampling synchronized with the pulsed source.

Although FIGS. 1 and 5 show the pointer 3 at the center of the work space in front of the display, the pointer 3 can be used in a range of locations in front of the display. Changing the position of the pointer will generally also change the ratio outputs. The ratio outputs will be approximately proportional to the distance between the center of the screen and the intersection of the pointer axis with the screen for pointer locations in a range of space in front of the screen. Typically, the pointer should be in the range of 6 inches to 36 inches away from the screen, which also corresponds to the range from which the user can comfortably read the screen while holding the pointer.

Some deviation from linearity arises from several causes. However, absolute linearity is not an important feature because prompt visual feedback of the cursor position allows the user to achieve the desired positioning rapidly.

With the invention, as compared to other conventional input devices, the pointing apparatus does not require any space next to the keyboard, as does a mouse. Further, the pointing device of the invention does not pick up dirt and become unreliable, nor does it require a grid surface as does an optical mouse. The present invention uses natural pointing motions and enables drawing on the screen and is an absolute positioning device. Further, the present invention does not require at least a 2-inch ball and housing near or attached to the keyboard, as do conventional trackballs. Further, conventional trackballs are large compared to the present invention.

Further, unlike light pens, the present invention need not be used on or very near the display screen and it is available in a wide range of positions distant from the screen. For these and other reasons, users of the present invention will not be likely to suffer arm fatigue as quickly as users of conventional input devices such as light pens. The inventive pointing device also can be comfortably held close to the user's body or desk and thus arm fatigue is further reduced. Further, there is no danger of the operator's arm obscuring the display with the inventive pointing device. Lastly, the inventive pointing device has high resolution.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A hand-held pointing device for positioning a cursor on a display having a plurality of illuminating devices at a periphery thereof, comprising:
    a housing;
    an interference filter coupled to said housing;
    means for detecting light having been emitted from said plurality of illuminating devices and filtered by said interference filter;
    means, coupled to said means for detecting, for distinguishing a region of the periphery of the display from which said light having been detected originates; and
    means for interpreting the detected light directly to position the cursor on the display,
    wherein said interference filter has a predetermined transmittance characteristic, said predetermined transmittance characteristic being dependent on an angle of incidence of said light upon said filter.

2. A hand-held pointing device according to claim 1, wherein said interference filter comprises a thin-film interference filter for measuring a change in transmittance as a function of an angle of incidence of said light being emitted from said plurality of illuminating devices.

3. A hand-held pointing device according to claim 1, wherein said illuminating devices are activated sequentially so as to emit light pulses, said means for detecting being synchronized with said light pulses.

4. A hand-held pointing device according to claim 1, wherein an angular orientation of said pointing device is determined based on said light filtered by said interference filter.

5. A pointing system for selectively positioning a cursor to be viewed, comprising:
    a display having a plurality of illuminating devices at a periphery thereof; and
    a pointing apparatus, coupled to said display, comprising:
        a housing;
        an interference filter coupled to said housing;
        means for detecting light having been emitted from said plurality of illuminating devices and filtered by said interference filter;
        means, coupled to said means for detecting, for distinguishing a region of the periphery of the display from which said light having been detected originates; and
        means for interpreting the detected light directly to position the cursor on said display,
        wherein said interference filter has a predetermined transmittance characteristic, said predetermined transmittance characteristic being dependent on an angle of incidence of said light upon said filter.

6. A pointing system according to claim 5, wherein said interference filter has a predetermined transmittance characteristic, said predetermined transmittance characteristic being dependent on an angle of incidence of said light upon said filter.

7. A pointing system according to claim 5, wherein said illuminating devices are activated sequentially so as to emit light pulses, said means for detecting being synchronized with said light pulses.

8. A pointing device for positioning a cursor on a display having a plurality of illuminating devices at a periphery thereof, comprising:
    a housing;
    means, coupled to said housing, for measuring a change in transmittance, as a function of an angle of incidence, of light emitted by said plurality of illuminating devices;
    means for detecting light having been emitted from said plurality of illuminating devices and measured by said measuring means;
    means, coupled to said means for detecting, for distinguishing a region of the periphery of the display from which said light having been detected originates; and
    means for interpreting the detected light directly to position the cursor on the display,
    wherein said means for measuring has a predetermined transmittance characteristic, said predetermined transmittance characteristic being dependent on an angle of incidence of said light upon said means for measuring.

9. A pointing device according to claim 8, wherein said means for measuring comprises a thin-film interference filter.

10. A pointing device according to claim 8, wherein said illuminating devices are activated sequentially so as to emit light pulses, said means for detecting being synchronized with said light pulses.

11. A pointing system according to claim 8, wherein an angular orientation of said pointing apparatus is determined based on said light filtered by said interference filter.

* * * * *